June 16, 1925.
R. CAROSELLI
1,542,032
DEVICE FOR SUPPORTING ELECTRIC WALL BRACKETS
Filed Dec. 1, 1924
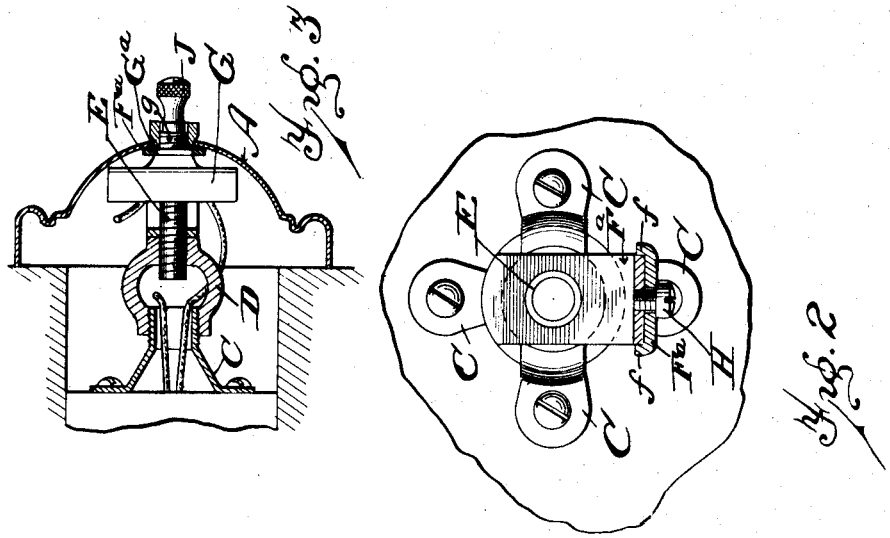
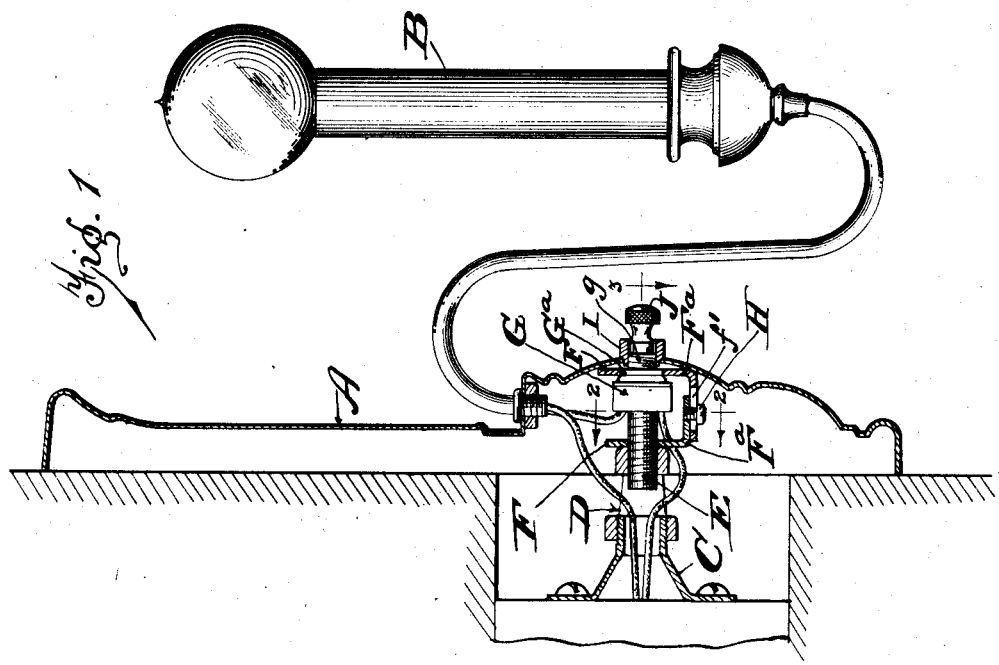
Inventor
Romulus Caroselli
By J.E. Thomas
Attorney Patented June 16, 1925.

1,542,032

UNITED STATES PATENT OFFICE.

ROMULUS CAROSELLI, OF DETROIT, MICHIGAN.

DEVICE FOR SUPPORTING ELECTRIC WALL BRACKETS.

Application filed December 1, 1924. Serial No. 753,404. REISSUED

*To all whom it may concern:*

Be it known that I, ROMULUS CAROSELLI, an Italian subject, residing at Detroit, county of Wayne, State of Michigan, have invented a certain new and useful Improvement in Devices for Supporting Electric Wall Brackets, and declare the following to be a full, clear, and exact description of the same, such as will enable others skilled in the art to which it pertains to make and use the same, reference being had to the accompanying drawings, which form a part of this specification.

My invention relates to a device for supporting an electric light wall bracket and switch, shown in the accompanying drawings and more particularly described in the following specification and claims.

Heretofore it has been customary to provide a wall bracket electric light fixture with holes adapted to receive the screws or other devices employed to secure it to the wall—an additional opening in the bracket being also provided to receive a push button or like device to control the operation of the switch.

The primary object of this invention therefore is to provide a simple and inexpensive device adapted to secure the wall bracket of an electric light fixture to a wall without punching a plurality of holes in the bracket for the passage of screws and a switch button, and without the employment of screws or like fastening devices to secure it to the wall.

A further object of the invention is to provide an adjustable device for supporting the bracket adapted to readily accommodate itself to different forms of bracket fixture construction.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a side elevation and sectional view of an electric light wall bracket showing an adjustable fixture for securing the bracket to the usual hickey,—also a stud for supporting the latter attached to the wall of an outlet opening.

Figure 2 is a cross-sectional view taken on or about line 2—2 of Figure 1.

Figure 3 is a horizontal sectional view taken on or about line 3—3 of Figure 1.

Referring now to the letters of reference placed upon the drawings:

A denotes a typical electric light wall bracket to which is secured a lamp fixture B.

C indicates a stud of usual construction attached to the wall of the outlet opening, upon which is mounted a hickey D, tapped to receive an adjustable nipple E, screwed therein.

F designates an electric light wall bracket supporting fixture comprising a pair of L-shaped telescoping plates $F^a$, $F^a$, respectively bored to receive the nipple E, and also a flange $G^a$ extending from the wall of an electric switch G, of usual construction.

The switch G is rigidly held between the walls of the bracket supporting fixture F by the nipple E, screwed in the hickey—adjusted so as to force the switch tightly against one of the walls of the fixture.

One of the L-shaped plates of the bracket supporting fixture is provided with side flanges $f$, $f$,—overlapping the edges of the other plate,—also an elongated slot $f'$, through which extends a screw H for securing the plates together when properly adjusted.

I denotes a nut—overlapping the wall bracket A—screwed upon a nipple $g$ projecting from the wall of the switch G to secure the latter to the adjustable fixture F and thus without other engaging devices against the wall of the room.

J indicates the milled head of the rotatable stem of the switch, extending through the nipple, to turn the light on or off as may be required.

Having now indicated the several parts by reference letters the construction and operation of the device will be readily understood:

The L-shaped plates of the supporting fixture F are first adjusted as may be required to accommodate the desired wall bracket of the electric fixture to be installed;—the switch is then assembled between the walls of the supporting fixture and the nipple E adjusted to force the switch rigidly against a wall of the latter. The wall bracket is then placed in position,—the nut I being adjusted to force the bracket against the supporting fixture F, thus attaching the bracket securely and without other fastening devices to the wall of the building.

Having thus described my invention what I claim is:

1. In a device of the character described, the combination of a hickey; an adjustable supporting fixture for a wall bracket comprising two telescoping L-shaped members, means for securing said members together when adjusted; an adjustable nipple screwed into the hickey and projecting through the wall of one of said L-shaped members; an electric switch adapted to be secured between the walls of the fixture by the adjustment of said nipple; an electric fixture including a wall bracket; a nut screwed to the switch extending through and overlapping the wall of said bracket, and means projecting through the nut for operating the switch.

2. In a device of the character described, the combination of a hickey; an adjustable supporting fixture for a wall bracket comprising two L-shaped members, adjustably secured to each other; an adjustable nipple screwed into the hickey and projecting through the wall of one of said L-shaped members; an electric switch adapted to be secured between the walls of the fixture by the adjustment of said nipple; an electric fixture including a wall bracket; a nut overlapping said wall bracket and screwed to the switch, and a rotatable stem extending through the nut for actuating the switch.

3. In a device of the character described, the combination of a hickey; an adjustable supporting fixture for a wall bracket comprising two telescoping L-shaped members, means for securing said members together when adjusted; an adjustable nipple screwed into the hickey and projecting through the wall of one of said L-shaped members; an electric switch adapted to be secured between the walls of the fixture by the adjustment of said nipple; an electric fixture including a wall bracket; a nut screwed to the switch extending through and overlapping the wall of said bracket, said electric switch having a rotatable stem projecting through the nut and fitted with a knurled head for actuating the switch.

In testimony whereof, I sign this specification in the presence of two witnesses.

ROMULUS CAROSELLI.

Witnesses:
S. E. THOMAS,
R. V. CORM.